United States Patent [19]

Fogg, Jr. et al.

[11] Patent Number: 4,995,056
[45] Date of Patent: Feb. 19, 1991

[54] SYSTEM AND METHOD FOR DATA COMMUNICATIONS

[75] Inventors: Richard G. Fogg, Jr., Austin; Joseph R. Mathis, Georgetown; Carl Zeitler, Jr., Austin, all of Tex.

[73] Assignee: International Business Machines Corporation, Armonk, N.Y.

[21] Appl. No.: 297,776

[22] Filed: Jan. 13, 1989

[51] Int. Cl.$^5$ .............................................. H04B 1/38
[52] U.S. Cl. ...................................... 375/7; 370/94.1
[58] Field of Search ...................... 375/118, 7; 370/60, 370/85, 94, 85.3, 94.1, 60, 79, 85.7; 340/825.5, 825.54

[56] References Cited

U.S. PATENT DOCUMENTS

| | | | |
|---|---|---|---|
| 4,551,834 | 11/1985 | Lienard | 370/94 |
| 4,617,657 | 10/1986 | Drynan et al. | 370/60 |
| 4,677,616 | 6/1987 | Franklin | 370/85 |
| 4,689,785 | 8/1987 | Toyonaga et al. | 375/94 |
| 4,727,537 | 2/1988 | Nichols | 370/85 |
| 4,740,958 | 4/1988 | Duxbury et al. | 370/96 |
| 4,744,079 | 5/1988 | Csapo et al. | 370/94 |
| 4,839,891 | 6/1989 | Kobayashi et al. | 370/60 |

Primary Examiner—Douglas W. Olms
Assistant Examiner—Stephen Chin
Attorney, Agent, or Firm—Andrew J. Dillon

[57] ABSTRACT

In a communications system, a sending system and a receiving system have multiple data buffers. In response to an inquiry from the sending system, the receiving system transmits information which indicates the size and number of data buffers available in the receiving system. The sending system then begins transmitting data frames, which are placed into the buffers of the receiving system. When the receiving system removes all of the data from a buffer, therefore freeing it to accept additional data, it sends a signal to the sending system indicating this fact. The sending system counts such signals, and ensures that the number of transmitted data frames does not exceed the number of frames which have been removed from the receiver's buffers by more than the number of buffers which the receiver has.

9 Claims, 2 Drawing Sheets

SYSTEM AND METHOD FOR DATA COMMUNICATIONS

CROSS-REFERENCE TO RELATED APPLICATION

The present application contains subject matter related to copending application Ser. No. 297,777, titled TRANSFER DIRECTION TURNAROUND IN NETWORKED DATA COMMUNICATIONS, filed on Jan. 13, 1989 and assigned to the assignee hereof, and which is herein incorporated by reference.

BACKGROUND OF THE INVENTION

1. Technical Field

The present invention is related to serial communication techniques for use between computer systems.

2. Background Art

Communication of data between computer systems over serial data links is quite common. Numerous protocols and standard data exchange formats have been developed. Data may be communicated synchronously or asynchronously, with synchronous communication protocols generally having higher data transmission rates.

Synchronous communication systems send data in discrete blocks, also referred to as frames or packets. Data frames typically include, in addition to the data itself, indicators for the beginning and end of the block, a cyclic redundancy check (CRC), and other control information. Since the communication is synchronous, the sender and receiver are required to use clocks having the same time base. This is generally accomplished by having the receiver regenerate the clock from the received data.

Such frame-based synchronous communication systems can encounter problems with pacing of the data. Received data is usually placed into buffers, from which it is extracted by the receiver. If, for some reason, the receiver is unable to remove data from the buffers as fast as data is being transmitted over the communications link, data overrun will eventually occur. In this situation, data is either lost or some recovery protocol must determine what data is missing and require that it be retransmitted. This situation is most likely to occur if the receiving system contains multiple input/output subsystems, or is otherwise heavily loaded with tasks other than the data exchange under consideration. Although the receiving system can easily keep up with a single I/O subsystem, the presence of multiple subsystems can cause the overall receiving system to fall behind some particular I/O channel.

Presently, systems are typically designed so that the receiving system will always have sufficient capacity to handle all of its I/O subsystems without the possibility of data overrun. Since all I/O channels are seldom operating simultaneously at full capacity, the receiving system has excess capacity most of the time. This overdesign requirement causes systems to be more expensive than they otherwise need to be. In addition, such systems have a limited capability for expansion, since the total I/O bandwidth of all channels must be less than that which can be handled by the system.

It would therefore be desirable to provide a communications system and method which prevents the possibility of data overruns regardless of the response time of the receiving system. It would be further desirable if such system would allow data to be transmitted over the link at maximum capacity when the receiving system is able to handle such data rates.

SUMMARY OF THE INVENTION

It is therefore an object of the present invention to provide a system and method for serial data communications which dynamically adjusts the data transmission rate over a communications link to a rate which can be adequately handled by the receiving system.

Therefore, in accordance with the present invention, prior to the initiation of data transfer a sending system determines the operating environment of a receiving system. In response to an inquiry from the sending system, the receiving system transmits information which indicates the size and number of data buffers available in the receiving system. The sending system then begins transmitting data frames, which are placed into the buffers of the receiving system. When the receiving system removes all of the data from a buffer, therefore freeing it to accept additional data, it sends a message to the sending system indicating this fact. The sending system counts such messages, and ensures that the number of transmitted data frames does not exceed the number of frames which have been removed from the receiver's buffers by more than the number of buffers which the receiver has.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
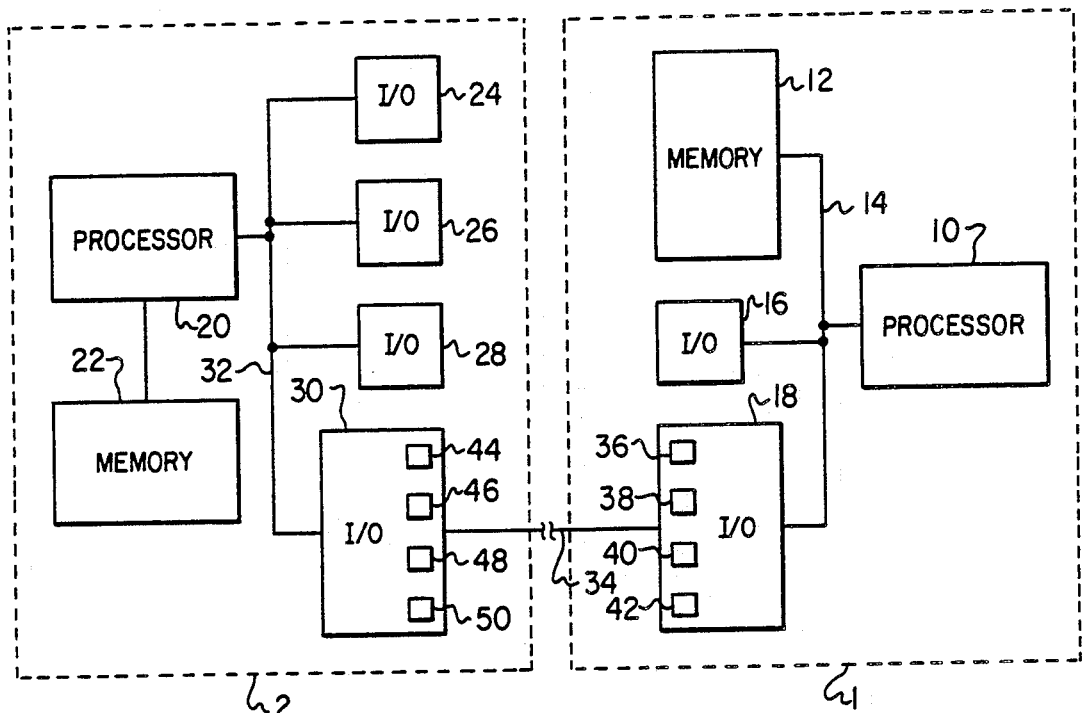
FIG. 1 is a block diagram of two computer systems and a communications link between them.

FIG. 1 illustrates a system for communicating data between two computer systems 1, 2. For the purposes of the discussion below, system 1 will be referred to as the sender, and is transmitting data to system 2, also referred to as the receiver. Both systems are preferably capable of operating as both a sender and a receiver.

System 1 includes a processor 10 which is coupled to a main system memory 12 through a system bus 14. Also attached to the system bus 14 are two input/output (I/O) controller devices 16, 18 which each support a single I/O channel.

System 2 includes a processor 20 coupled to a main system memory 22. Also attached to the processor are four I/O controller units 24, 26, 28, 30, which communicate with the processor 20 through an I/O bus 32.

System 1 is illustrated as having its main system memory 12 connected to the processor 10 on the same bus 14 as the I/O devices 16, 18. System 2 has its main system memory 22 connected to its processor 20 independently of its I/O bus 32. These are simply two typical computer system configurations, and the details of such system configurations are not relevant to the present invention.

The two systems 1, 2 are connected by a data link 34. This link 34 can be a simple direct connection, or may include computer network controllers, telephone switching systems, and satellite data links. The precise nature of the communications link 34 is not important to the present invention, but a preferred embodiment includes at least a limited form of full duplex communication on such link as will be described below.

The I/O device 18 contains four transmit/receive buffers 36, 38, 40, 42. These buffers are configured for use as "ping-pong" buffers as known in the art. I/O device 30 also contains four buffers 44, 46, 48, 50.

All of the buffers in I/O device 18 are preferably the same size, and typical sizes would be 256 or 512 bytes. All the buffers 44, 46, 48, 50 in I/O device 30 are also preferably the same size, but may be a different size from those in I/O device 18. The exact number of buffers in each I/O device 18, 30 may vary, although a minimum of two are required for a ping-pong buffer arrangement. It is expected that systems utilizing the present invention will often not have the same number of buffers in the sending and receiving systems, as will be explained below.

Figure 2:
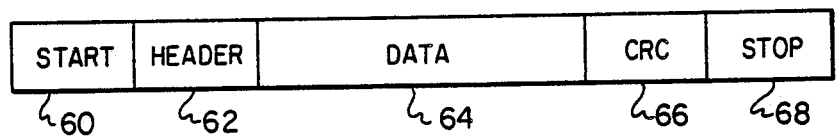
FIG. 2 is a diagram illustrating the structure of a data frame.

FIG. 2 shows a data frame such as typically used with the present invention. Each frame begins with a start sequence 60, a uniquely identifiable bit sequence which is recognized by a receiving system as the beginning of a new frame. Next follows a header 62, which contains control information, such as the sending and receiving addresses for computer systems on a network. Next comes the data 64 itself, followed by cyclic redundancy check (CRC) information 66. The last item in the data frame is a stop marker 68. The start 60, header 62, CRC 66 and stop 68 field are added by the transmit circuitry, and stripped by the receiver. Only the data 64 is placed into the buffers at the receiving end. Additionally, the data field 64 may itself be encoded, using techniques such as 0 insertion/deletion, and the data 64 is decoded by the receiver prior to placing the data in a buffer. The nature of any data encoding, if done, does not constitute part of the present invention. The size of the unencoded data field 64 should be less than or equal to the size of the receive buffers 44, 46, 48, 50.

Figure 3:
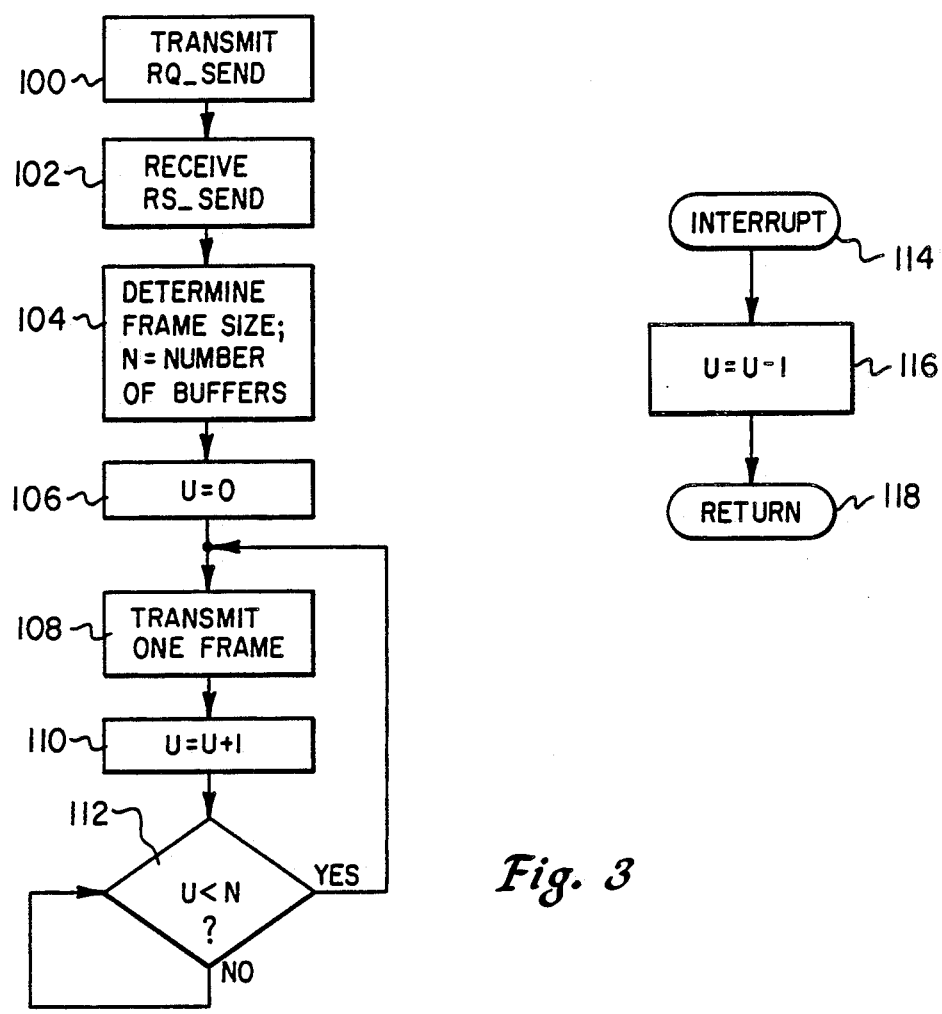
FIG. 3 is a flowchart illustrating the operation of a sending unit.

FIG. 3 is a flowchart illustrating the operation of the sending I/O device 18 when data is transmitted from the sender 1 to the receiver 2. The process begins when the sending device 18 transmits a request to send (RQ_SEND) message 100 to the receiving device 30 across the communications link 34. When RQ_SEND is received in the device 30, it transmits 102 a message RS_SEND back to the sending device 18. The message RS_SEND contains information about the capabilities of the receive buffer 30; in the preferred embodiment such information includes the size of the buffers 44, 46, 48, 50 and the number of buffers which are available. The example shown in FIG. 1 shows four available buffers, and RS_SEND communicates the number of buffers that there happen to be.

In step 104, the sending device 18 determines the frame size and number of buffers just described, and retains these values. The unencoded size of the data field 64 is set to either the frame size of the receiving buffers 44, 46, 48, 50, or the buffer size of the sending buffers 36, 38, 40, 42, whichever is less. In this way, the sending device 18 will not send blocks of data to the receiving device 30 which will not fit into a single receiving buffer. Also in step 104, a value N is set to the number of buffers contained within the receiving device 30.

The buffer size can be transmitted using a prearranged code, such as a 2 bit field. Values in this field can correspond to known buffer sizes. For example, the following coding scheme can be used to communicate buffer sizes: 00–256 bytes; 01–512 bytes; 10–1024 bytes; and 11–special value to be communicated separately as an integer. Two additional bits can be used to communicate the number of buffers. For example, the following coding scheme could be used: 00–2 buffers; 01–4 buffers; 10–6 buffers; and 11–8 buffers.

In step 106, a counter U is set to 0. This counter will be used to indicate how many data frames have been transmitted from the sending device 18 to the receiving device 30 which have not been acknowledged, as will be described below.

The sending device 18 then enters a loop in which it will stay until the transmission is completed. First, a single frame is transmitted 108. When such frame is transmitted, the counter U is incremented 110, and a check is made 112 to see if U is less than N. If so, the receiver 30 has at least one buffer available to receive a data frame, and control returns to step 108. If U is equal to N, all of the buffers in the receiver 30 have been filled, and no more data can be transmitted.

Whenever the receiving device 30 has emptied one of the I/O buffers 44, 46, 48, 50 into main memory 22 or elsewhere, that buffer is then able to accept new data. Whenever a buffer is freed, a message is transmitted from the receiving device 30 to the sending device 18 indicating such fact. This message acts as an "acknowledge" signal that a buffer in the receiving device 30 has been cleared. Receipt of this message in the sending device 18 generates an interrupt 114, which causes U to be decremented 116. After decrementing U, the sending device 18 returns from the interrupt 118.

Therefore it can be seen from FIG. 3 that U is incremented 110 whenever a frame is transmitted, and decremented 116 whenever a buffer is freed in the receiving device 30. This mechanism ensures that the total number of transmitted frames never exceeds the number of frames which have been acknowledged (i.e. removed from a buffer by the receiving device 30).

FIG. 3 describes a process suitable for use with a microcontroller in the transmitting device 18. Thus, the use of an interrupt mechanism for decrementing U is described when an acknowledge message is received. If hard-wired random logic control, such as a PAL, is used instead of a microcontroller, the interrupt mechanism would not be used. However, the equivalent function of decrementing a counter when an acknowledge message is received is still performed. Any control mechanism which performs functions equivalent to those described in connection with FIG. 3 can be used with the present invention.

Figure 4:
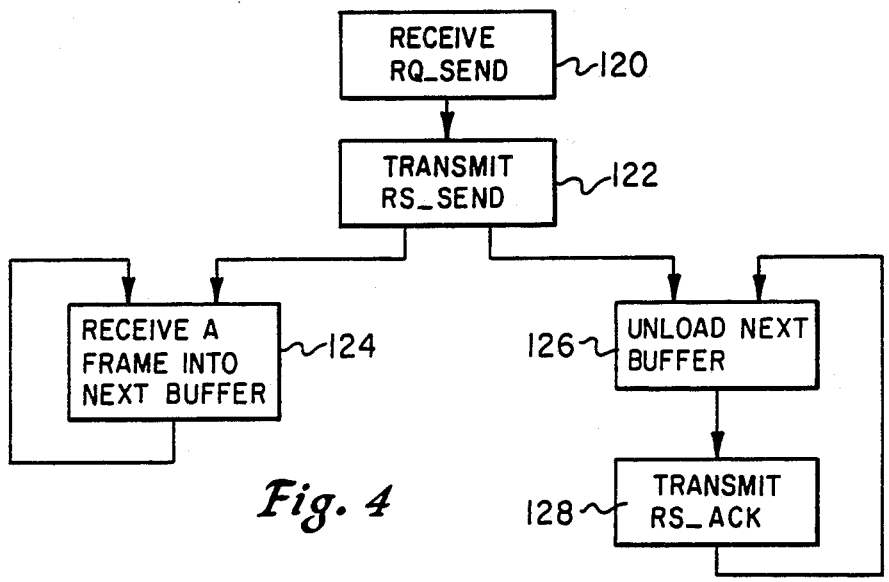
FIG. 4 is a flowchart illustrating operation of a receiving unit.

FIG. 4 is a flowchart illustrating operation of the receiving device 30. When the RQ_SEND message is received 120, the RS_SEND message is transmitted back to the sender 122. At this point, two parallel processes begin. In step 124, new data frames are constantly received into the next available buffer. The receiving device 30 does this independently of the remainder of the system 2. In parallel with this, the system 2 is unloading data from the buffers 44, 46, 48, 50 and copying it to main memory 22 or some other portion of the system. (Step 126) When a buffer is completely cleared, the message RS_ACK is transmitted back to the sender 128. RS_ACK is the acknowledge message used by the sending device 18 to generate the interrupt 114. These two processes continue in parallel until data transmission is complete, and the last received frame has been acknowledged.

System 2, due to additional demands on the processor 20 or the I/O bus 32, may not always be able to unload the buffers from the receiving device 30 as fast as data is communicated over the link 34. Likewise, processor 10 may not be able to load buffers in the sending device 18 fast enough to make use of the maximum channel capacity of the link 34. When traffic on the buses 14 and 32 allows the buffers at both ends to be loaded and unloaded quickly enough, data will be transmitted over the link 34 at the maximum channel capacity. If either system is unable to load or unload its buffers fast enough, the time between consecutive data frames will be increased, resulting in a lower overall data rate. However, because of the hand shaking signal RS_ACK and the fact that the sending device 18 knows how many buffers are in the receiving device 30, no data will be lost.

Figure 5:
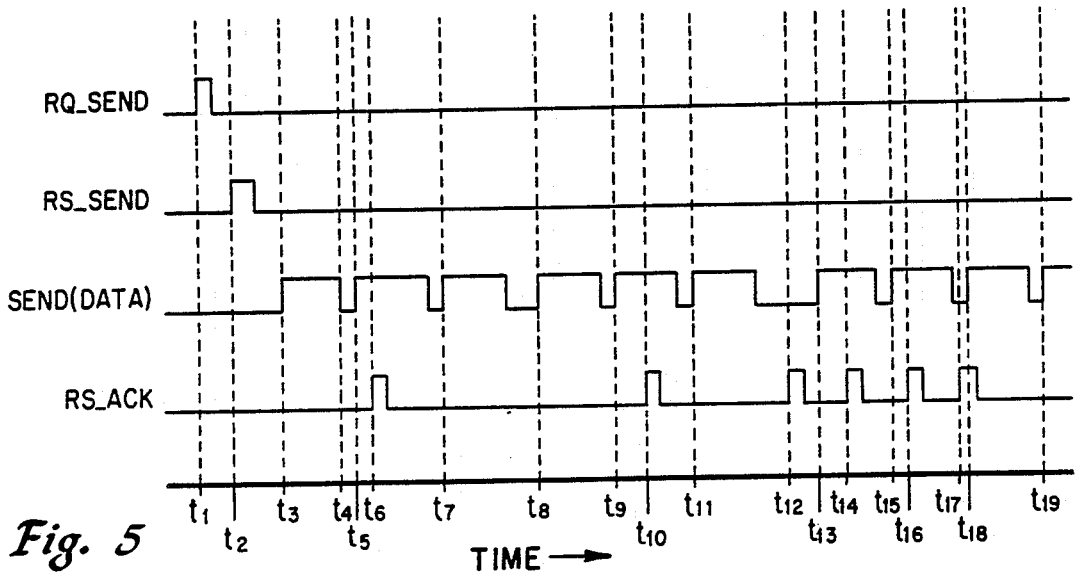
FIG. 5 is a timing diagram illustrating operation of the system.

FIG. 5 is a timing diagram illustrating how these features affect operations of the communication system. The signal timing shown in FIG. 5 is only part of a communication example, and the timing of various events is selected to illustrate various features of the system. In FIG. 5, a low value indicates that a particular message is not being transmitted, and a high value indicates the time period during which a particular message is being transmitted or received. FIG. 5 shows the times during which messages are transmitted and received as seen by the sending device 18. Due to transmission delays, a similar timing diagram for the receiving device 30 would show the same events happening at slightly different times.

At time $t_1$ RQ_SEND is transmitted by the sending device 18. The receiving device 30 then responds with the message RS_SEND at time $t_2$, which contains the receive buffer size and the number of buffers. At time $t_3$ the sending device 18 begins transmitting data frames. Transmission of the first frame is completed at time $t_4$, and the second frame is transmitted beginning at time $t_5$. It is typical for communication systems to have some minimum time delay ($t_5-t_4$) between successive frames, but this is not required. While the second frame is being transmitted, an RS_ACK message is transmitted by the receiving device 30, indicating that the first data frame has been cleared from its buffer. At time $t_7$, a third frame is transmitted.

Immediately before $t_8$, three frames have been transmitted and one RS_ACK signal received. This means that, according to the flowchart of FIG. 3, U has the value 2. Since 2 is less than the number of buffers in the receiving device 30, the sending device 18 can continue to send data. Thus, two more frames are transmitted at times $t_8$ and $t_9$. The delay before sending the frame beginning at $t_8$ illustrates that delays caused by system loading on system 1 have no undesirable effects. The sending device 18 simply waits until the next frame is ready.

RS_ACK is again sent at time $t_{10}$. Thus, at time $t_{11}$, U=3, indicating that another data frame can be sent. This occurs with no extra delay, assuming a next frame is available to be sent.

After the frame beginning at time $t_{11}$ has been sent, six frames have been transmitted, and two RS_ACK messages received. Thus, U=4, and no more frames can be transmitted at this time. The sending device 18 will delay until another RS_ACK message is received, which occurs at time $t_{12}$. In response, another frame is transmitted at time $t_{13}$. Several additional RS_ACK messages follow at times $t_{14}$, $t_{16}$, and $t_{17}$, indicating that the receiver processor 20 has been able to unload buffers from the receiving device 30 at a rapid rate. This allows data to be transmitted at times $t_{15}$, $t_{18}$ and $t_{19}$ with the minimum system delay.

The process illustrated in FIG. 5 continues until transmission is complete. This can be indicated by transmission of any special end transmission message as known in the art.

It will be appreciated that, when the sending device 18 has buffers containing data to be sent, and the receiving device 30 has available buffers, data will be transmitted over the link 34 at the maximum rate allowed by the system. If the receiving device 30 falls behind, so that all of its buffers 44, 46, 48, 50 are filled, no more data will be transmitted. It is not necessary for the receiving device 30 to send a special message indicating this condition; the sending device 18 knows how much data it can safely send. If the sending device 18 is unable to keep up, the system encounters no problems.

Such a communication setup is especially useful when there is a significant transmission delay between the sending device 18 and the receiving device 30. This delay can be caused by sending the data over long distances, such as encountered with satellite links, and delays caused by various electronic switches along the link 34. Communications links having significant transmission delays are often unable to communicate messages to stop sending data in time to prevent data overrun. Since, in the system described above, the sending device 18 knows in advance how much data the receiving device 30 can manage, no such message is required.

Another feature of the described system is a check on the number of received data frames as indicated by the RS_ACK messages. The number of RS_ACK messages received by the sending device 18 should equal the number of data frames sent. If they are not equal, one or more frames have been lost. The sending device 18 should wait for some predetermined length of time after the last frame is sent, and signal a transmission error if the number of RS_ACK messages is incorrect. At that time, the data can be resent, or other appropriate action initiated.

The system described above has the further advantage that processors in a large network do not need to know the configurations of all possible receivers. Since the receiving environment (i.e., buffer size and number of buffers) is determined when the data transfer is made, it is not necessary to attempt to update any system-wide parameters when one system is reconfigured or a new system added to the network.

It will become apparent to those skilled in the art that the system and method described above can be used with communications systems which transmit data using parallel as well as serial techniques.

A variation on the system described above allows the receiving device 30 to initiate communication by transmitting a "request to receive" message to the sending device 18. This message includes the buffer size and number information normally included in RS_SEND. Upon receipt of this message, the sending device sends data in the manner described above. The only difference is the identity of the device initiating the transfer.

While the invention has been particularly shown and described with reference to a preferred embodiment, it will be understood by those skilled in the art that various changes in form and detail may be made therein without departing from the spirit and scope of the invention.

We claim:

1. A method for transmitting data from a first system to a second system, comprising the steps of:
    transmitting, from the second system to the first system, a message indicating a number of physically distinct receive buffers, and a buffer size for the receive buffers;
    placing received blocks of data into the receive buffers at the second system;
    removing blocks of data from the receive buffers;
    transmitting an acknowledge message to the first system for each block of data which is removed from a receive buffer; and
    transmitting a plurality of blocks of data from the first system to the second system, wherein a next block of data is transmitted only when the difference between the number of data blocks transmitted and the number of acknowledge messages received is less than the number of receive buffers, and wherein the length of the transmitted data blocks is no greater than the buffer size of the receive buffers.

2. A system for communicating data, comprising:
    a first system for transmitting blocks of data and receiving acknowledge messages;
    a transmission link coupled to said first system for communication of data and messages; and
    a second system coupled to said transmission link, wherein said second system includes at least 2 distinct physical receive buffers, and wherein said second system transmits an acknowledge message when received data is cleared from a receive buffer and such receive buffer is ready to receive data, and wherein said second system transmits to said first system, prior to its starting data transmission, the number and size of the physical receive buffers;
    wherein said first system transmits a block of data only when said first system determines, by counting the acknowledge messages, that said second system has at least one buffer ready to receive data, and wherein the transmitted blocks of data have a length no greater than the size of the physical receive buffers.

3. The system of claim 2, wherein the blocks of data are transmitted serially.

4. A method for transmitting data from a first system to a second system, comprising the steps of:
    transmitting over a communications channel, from the first system to the second system, a request to send message;
    transmitting over the communications channel, from the second system to the first system, a message indicating a number of distinct physical receive buffers available in the second system, and the size of such buffers;
    transmitting blocks of data over the communications channel from the first system to the second system, wherein the blocks of data have a length no greater than the size of the second system receive buffers;
    receiving the transmitted blocks of data at the second system and placing them into the receive buffers, wherein each block of data is placed into a separate receive buffer;
    removing blocks of data from the receive buffers; and
    transmitting over the communications channel, from the second system to the first system, an acknowledge message each time a block of data is removed from a receive buffer;
    wherein the first system transmits a next block of data only when the number of unacknowledged data blocks are less than the number of physical receive buffers in the second system.

5. The method of claim 4, wherein the blocks of data transmitted in step (c) are transmitted as serial data.

6. A method for transmitting data from a first system to a second system, comprising the steps of:
    (a) transmitting over a data channel, from the first system to the second system, a request to send message;
    (b) transmitting over the data channel, from the second system to the first system, a message indicating how many physical communications buffers are available (B) in the second system, and the size of the buffers;
    (c) transmitting over the data channel, from the fist system to the second system, blocks of data, wherein the blocks have a size less than or equal to the size of the physical communications buffers in the second system, and wherein the total number of blocks transmitted is T;
    (d) storing the blocks of data into the physical communications buffers in the second system as they are received;
    (e) reading the blocks of data out of the buffers in the second system; and
    (f) transmitting over the data channel, from the second system to the first system, an indication message when a block of data has been read out of a buffer, wherein the total number of transmitted indication messages is I;
    wherein the sender transmits a next block of data only when:

$$T-I<B.$$

7. A communications subsystem for a computer system, comprising:
    at least two data buffers connected to a communications line; and
    an input/output controller coupled to said data buffers, said controller having two operating modes, wherein:
    in the first mode, said controller, in response to a request to send message received on the communications line, transmits on the communications line information indicating the number of data buffers, wherein said controller removes from the data buffers data transmitted thereto on the communications line, sending such data to the computer system and freeing the data buffer to receive new data, and wherein said controller sends an acknowledge message on the communications line each time a data buffer has been freed to receive new data; and
    in the second mode, said controller transmits a request to send message on the communications line and receives from the communications line information indicating a number of data buffers in a remote system, wherein said controller receives acknowledge messages on the communications line, wherein said controller receives data from the computer system and places it into the data buffers, and wherein said controller transmits data from said data buffers on the communications line in frames, wherein the number of unacknowledged data frames is no larger than the number of data buffers in the remote receiving system.

8. The system of claim 7, wherein:

in the first mode, said controller, in response to a received request to send message, also transmits information indicating the size of the data buffers; and in the second mode, said controller receives information indicating the size of the data buffers in the remote system, and wherein the transmitted frames are no larger than the size of the data buffers in the remote system.

9. The system of claim 7, wherein the transmission line is a serial communications line.

* * * * *